US012159744B2

(12) United States Patent
Ishigaki et al.

(10) Patent No.: US 12,159,744 B2
(45) Date of Patent: Dec. 3, 2024

(54) INDUCTOR WITH VARIABLE PERMEABILITY CORE

(71) Applicant: TOYOTA MOTOR ENGINEERING & MANUFACTURING NORTH AMERICA, INC., Erlanger, KY (US)

(72) Inventors: Masanori Ishigaki, Ann Arbor, MI (US); Ercan Mehmet Dede, Ann Arbor, MI (US); Danny J. Lohan, Champaign, IL (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 17/307,134

(22) Filed: May 4, 2021

(65) Prior Publication Data

US 2021/0257138 A1 Aug. 19, 2021

Related U.S. Application Data

(62) Division of application No. 15/418,141, filed on Jan. 27, 2017, now abandoned.

(51) Int. Cl.

| | |
|---|---|
| ***H01F 3/14*** | (2006.01) |
| ***H01F 3/10*** | (2006.01) |
| ***H01F 17/04*** | (2006.01) |
| ***H01F 38/02*** | (2006.01) |
| *H01F 17/06* | (2006.01) |

(52) U.S. Cl.

CPC ................ *H01F 3/10* (2013.01); *H01F 3/14* (2013.01); *H01F 17/04* (2013.01); *H01F 38/023* (2013.01); *H01F 2003/106* (2013.01); *H01F 2017/067* (2013.01)

(58) Field of Classification Search

CPC ... H01F 3/10; H01F 3/14; H01F 17/04; H01F 38/023; H01F 2003/106; H01F 2017/067

See application file for complete search history.

(56) References Cited

U.S. PATENT DOCUMENTS

| | | | | |
|---|---|---|---|---|
| 3,564,708 | A | 2/1971 | Harris | |
| 4,758,808 | A | 7/1988 | Sasaki et al. | |
| 4,845,452 | A * | 7/1989 | Sasaki | H03H 1/00 336/200 |
| 5,189,572 | A | 2/1993 | Gooch | |

(Continued)

FOREIGN PATENT DOCUMENTS

| | | |
|---|---|---|
| JP | 3-044012 | 2/1991 |
| JP | 5-243051 | 9/1993 |

(Continued)

OTHER PUBLICATIONS

Japanese Office Action issued Feb. 8, 2022 in Japanese Patent Application No. 2018-009628 (with English translation), 7 pages.

*Primary Examiner* — Tuyen T Nguyen
(74) *Attorney, Agent, or Firm* — Oblon, McClelland, Maier & Neustadt, L.L.P.

(57) ABSTRACT

An inductor includes a magnetic core composed of a magnetic material having variable permeability characteristics based on at least one of design parameters or operational parameters of the inductor that includes one or more air gaps. A coil is wound through the one or more air gaps and is configured to be excited by an electric current.

17 Claims, 12 Drawing Sheets
(9 of 12 Drawing Sheet(s) Filed in Color)

(56) References Cited

U.S. PATENT DOCUMENTS

| | | | | |
|---|---|---|---|---|
| 5,684,678 | A | 11/1997 | Barrett | |
| 5,774,028 | A | 6/1998 | Kim | |
| 6,980,077 | B1 | 12/2005 | Chandrasekaran et al. | |
| 7,567,163 | B2 | 7/2009 | Dadafshar et al. | |
| 9,251,944 | B2 | 2/2016 | Hsieh et al. | |
| 9,324,495 | B2 | 4/2016 | Fontana, Jr. et al. | |
| 9,799,440 | B2 | 10/2017 | Inoue et al. | |
| 2002/0097127 | A1 | 7/2002 | Fujiwara et al. | |
| 2004/0080978 | A1 | 4/2004 | Jitaru | |
| 2007/0252669 | A1* | 11/2007 | Hansen | H01F 17/06 336/212 |
| 2011/0109416 | A1 | 5/2011 | Hsiao et al. | |
| 2012/0299686 | A1* | 11/2012 | Matsuda | H01F 27/245 336/212 |
| 2014/0055226 | A1* | 2/2014 | Hsieh | H01F 27/24 336/212 |
| 2014/0210585 | A1* | 7/2014 | Peck, Jr. | H01F 27/2823 336/175 |
| 2015/0340147 | A1 | 11/2015 | Pennander | |
| 2016/0086723 | A1 | 3/2016 | Su et al. | |
| 2019/0295761 | A1 | 9/2019 | Miyashita et al. | |

FOREIGN PATENT DOCUMENTS

| | | | | | |
|---|---|---|---|---|---|
| JP | 07297037 | A | * | 11/1995 | |
| JP | 10074638 | A | * | 3/1998 | H01F 17/04 |
| JP | 2000-228319 | A | | 8/2000 | |
| JP | 3560530 | B2 | * | 9/2004 | A23L 23/00 |
| JP | 2007165346 | A | * | 6/2007 | |
| KR | 20070082539 | A | * | 8/2007 | |
| WO | WO 2018/123410 | A1 | | 7/2018 | |

* cited by examiner

INDUCTOR WITH VARIABLE PERMEABILITY CORE

RELATED APPLICATIONS

This application is a divisional of U.S. application Ser. No. 15/418,141, filed on Jan. 27, 2017. The entire disclosure of the prior application is hereby incorporated by reference in its entirety.

BACKGROUND

Non-linear inductor performance characteristics of planar inductors can result in non-uniform flux densities and widespread flux density saturation, which causes inductor losses and degraded inductor performance. U.S. Patent Application Publication 2014/0210585 to Peck describes an electromagnetic device with a variable magnetic flux core having a plurality of core sections stacked on top of one another having varied geometries and materials to provide a predetermined inductance performance.

SUMMARY

In an exemplary implementation, an inductor includes a magnetic core composed of a magnetic material having variable permeability characteristics based on at least one of design parameters or operational parameters of the inductor that includes one or more air gaps. A coil is wound through the one or more air gaps and is configured to be excited by an electric current.

The inductor can be a planar inductor.

The design parameters can include at least one of dimensions of the magnetic core, shape of the magnetic core, positions of the one or more air gaps on the magnetic core, size of the one or more air gaps, or material properties of the magnetic core.

The operational parameters can include at least one of an inductance, direct current (DC) bias, flux density characteristics, or core loss characteristics of the inductor.

The variable permeability characteristics of the magnetic core can correspond to an amount of permeability nonlinearity in which a permeability for a predetermined amount of flux density is greater than a predetermined threshold. The variable permeability characteristics of the magnetic core can also correspond to a flux density saturation area of the magnetic core that is less than a predetermined threshold. The variable permeability characteristics of the magnetic core can also correspond to a core loss density in the magnetic core that is less than a predetermined threshold.

A shape of the one or more air gaps in the magnetic core can correspond to a predetermined flux density pattern across the magnetic core. The shape of the one or more air gaps can be an oval shape.

The magnetic core can be a single structure produced using a binder (e.g., resin) matrix with magnetic filler material via three-dimensional (3D) printing.

The magnetic core can be composed of a heterogeneous ferrite material having a plurality of densities throughout the magnetic core. Each of the plurality of densities throughout the magnetic core can correspond to a ratio of the ferrite material to air at one or more locations throughout the magnetic core, wherein the ratio of the ferrite material to air is based on the variable permeability characteristics.

The magnetic core can be composed of a homogenous ferrite material having a plurality of slits in which the plurality of slits are configured at predetermined locations and orientations throughout the magnetic core based on the variable permeability characteristics.

The magnetic core can be composed of a heterogeneous ferrite material having a first ferrite material with a first density at one or more first locations within the magnetic core, and a second ferrite material with a second density at one or more second locations within the magnetic core in which the first density and the second density are based on a ratio of the ferrite material to air. The first density of the first ferrite material can be greater than the second density of the second ferrite material. The magnetic core can include a plurality of slits configured at predetermined locations and orientations throughout the magnetic core based on the variable permeability characteristics. The one or more first locations of the first ferrite material and the one or more second locations of the second ferrite material can be based on the variable permeability characteristics.

The inductor can further include a plurality of stacked magnetic cores composed of a magnetic material having variable permeability characteristics based on at least one of the design parameters or the operational parameters of the inductor.

In another exemplary implementation, a process includes determining design parameters for an inductor including at least one of dimensions of a magnetic core, shape of the magnetic core, positions of one or more air gaps on the magnetic core, size of the one or more air gaps, or material properties of the magnetic core; determining operational parameters for the inductor including at least one of an inductance, DC bias, flux density characteristics, or core loss characteristics; and providing a magnetic core composed of a magnetic material having variable permeability characteristics based on at least one of the design parameters or the operational parameters of the inductor that includes one or more air gaps.

In another exemplary implementation, a magnetic core for an inductor includes a magnetic material having variable permeability characteristics based on at least one of design parameters or operational parameters of the inductor that includes one or more air gaps in which the one or more air gaps are configured to receive a coil wound through the one or more air gaps configured to be excited by an electric current.

BRIEF DESCRIPTION OF THE DRAWINGS

The patent or application file contains at least one drawing executed in color. Copies of this patent or application publication with colors drawings will be provided by the Office upon request and payment of the necessary fee.

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
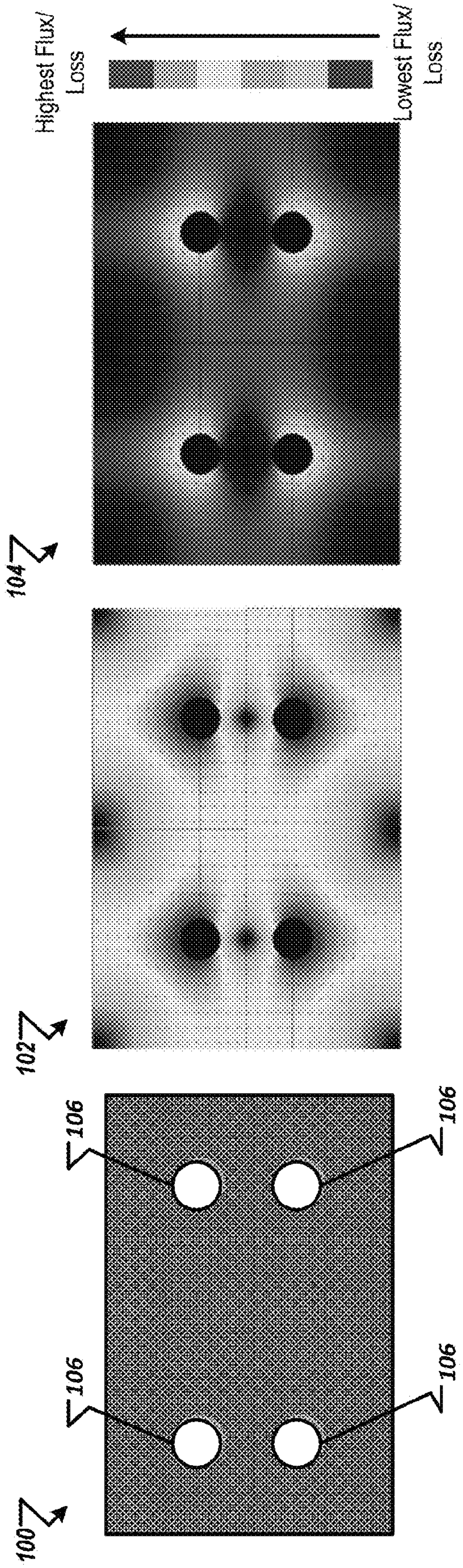
FIG. 1 is an exemplary illustration of core structure, flux density, and core loss density of an inductor magnetic core.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

Aspects of the present disclosure are directed to implementations for a planar inductor having a magnetic core made of non-linear magnetic material. In planar inductor implementations where an inductor coil is wound through holes in a magnetic core, magnetic flux spreads through the magnetic core based on a non-uniform magnetic resistance of the magnetic core, which results in a non-uniform flux density. The non-uniformity of the magnetic resistance and non-linear characteristics can increase a design complexity of magnetic cores and result in increased magnetic core size. The implementations described herein are directed to improving flux density distributions and reducing inductor losses by designing variable permeability magnetic cores using structural design optimization techniques and three-dimensional (3D) printing in order to design smaller magnetic cores with more uniform and predictable magnetic flux distributions.

FIG. 1 is an exemplary illustration of core structure 100, flux density 102, and core loss density 104 of a magnetic core of a planar inductor. As shown in the illustration of the core structure 100, the plated magnetic core has one or more holes 106 for winding copper windings of the inductor, and a top and bottom of the windings are connected with plane copper layers by using PCB technology. In some implementations, the core structure 100 is composed of a homogeneous ferrite material and has a rectangular shape. When the core structure 100 is designed, various design parameters can be taken into account to achieve predetermined operational parameters of the planar inductor. For example, the design parameters can include at least one of dimensions of the magnetic core, shape of the magnetic core, positions of the one or more air gaps on the magnetic core, size of the one or more air gaps, or material properties of the magnetic core.

When the copper windings are excited by an electric current, the magnetic core has flux density characteristics as shown in flux density illustration 102 and core loss characteristics as shown in core loss illustration 104. As can be seen from the flux density illustration 102, the flux density of the planar inductor having core structure 100 is non-uniform. For example, some areas have a high flux density that reaches saturation, and some areas have low flux density. In some implementations, flux density saturation results in an inductance reduction due to reduced permeability while areas of lower flux densities have higher permeability and inductance than the areas of flux density saturation.

Figure 2:
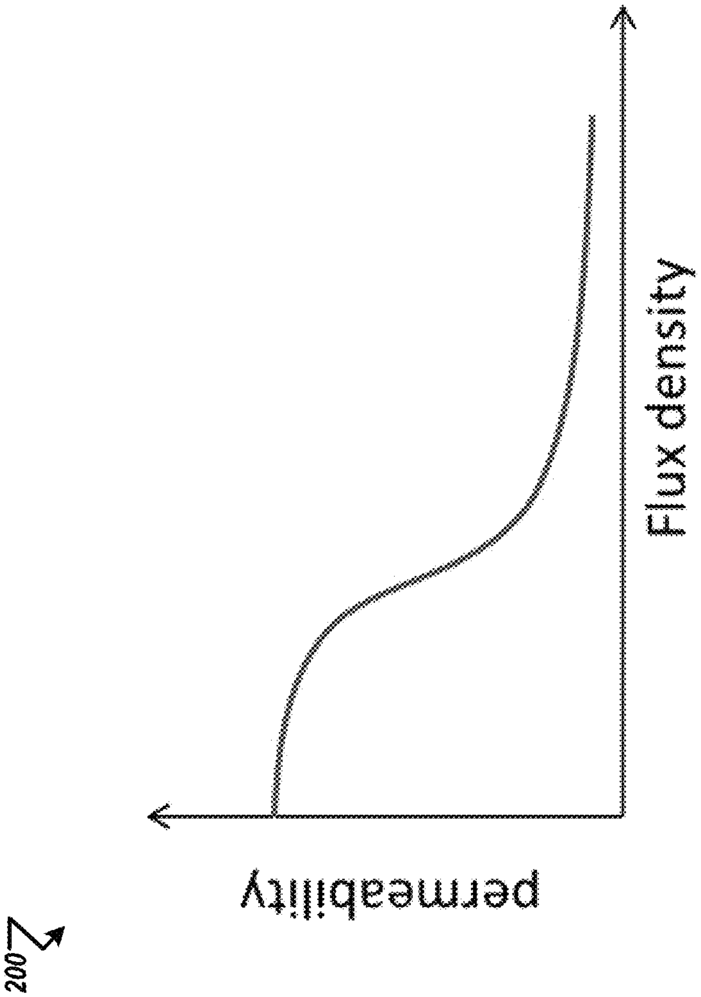
FIG. 2 is an exemplary graph of inductor permeability versus flux density for an inductor.

FIG. 2 is an exemplary graph 200 of inductor permeability versus flux density for the planar inductor described in FIG. 1. At low flux densities, the permeability of the magnetic core is higher than at higher flux densities due to a non-linear performance of the planar inductor. Because of the non-linear characteristics and flux density distribution shown in the graph 200, designing inductance and loss properties of the inductor can be difficult.

Figure 3:
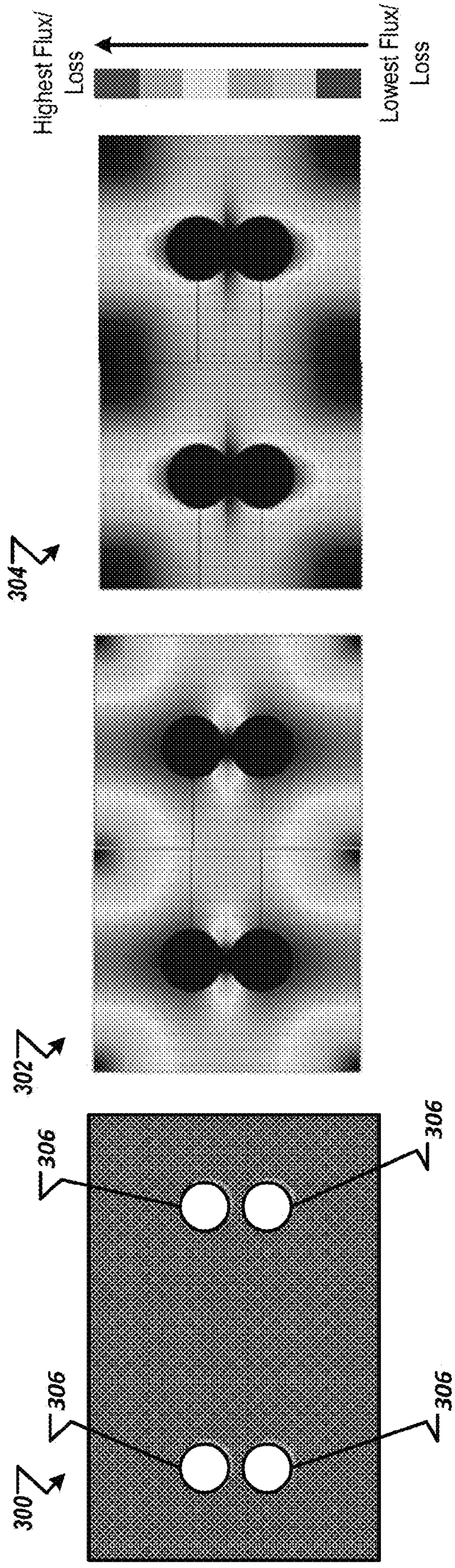
FIG. 3 is an exemplary illustration of core structure, flux density, and core loss density of an inductor magnetic core.

FIG. 3 is an exemplary illustration of core structure 300, flux density 302, and core loss density 304 of a magnetic core of a planar inductor that has a structure that is similar to the planar inductor described with respect to FIG. 1 but has a smaller length and width but a larger depth than the inductor of FIG. 1. The core structure 300 also includes one or more holes 106 for winding copper windings of the inductor and is composed of a homogenous ferrite material. While the core structure 300 may provide the same amount of inductance in a smaller volume than the core structure 100, as shown in flux density illustration 302, a larger amount of the core structure 300 reaches saturation, and core losses are also greater, as shown in the core loss density illustration 304. Due to the high flux density experienced by a large area of the core structure 300, an amount of inductance that can be achieved by the inductor may be limited.

Figure 4:
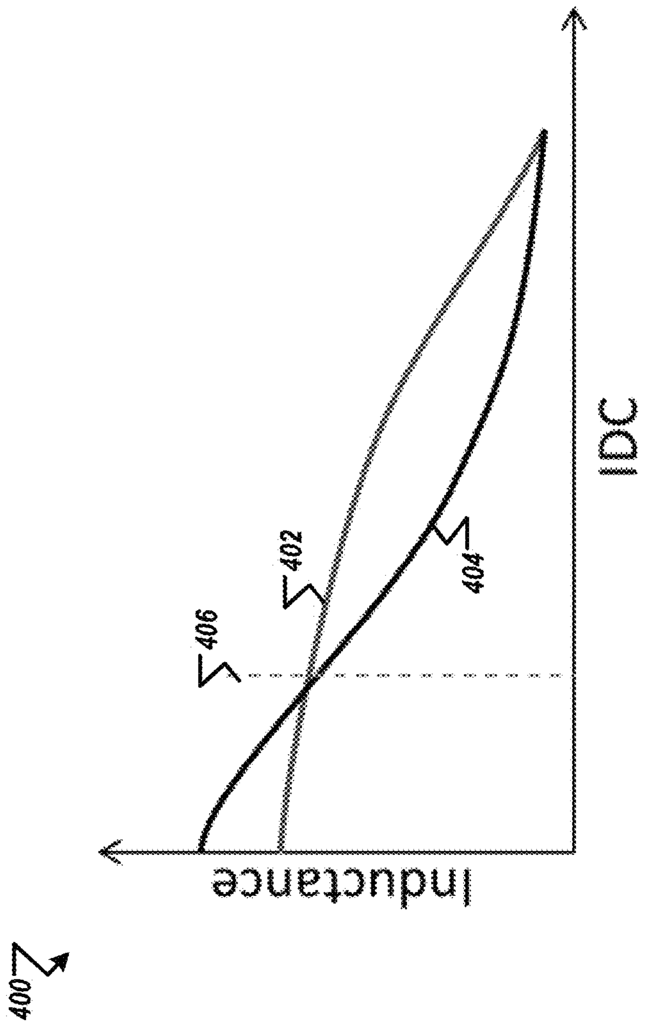
FIG. 4 is an exemplary graph of inductance versus direct current (DC) bias for an inductor.

FIG. 4 is an exemplary graph 400 of inductance versus direct current (DC) bias for the planar inductors described previously with respect FIG. 1 and FIG. 3. For example, curve 402 corresponds to the inductor from FIG. 1, and curve 404 corresponds to the inductor from FIG. 3. As shown in the graph 400, both inductors are biased to a predetermined inductance for a predetermined current, but the curve 404 has a steeper reduction in inductance as the current ($I_{DC}$) due to an increased core area that experiences flux density saturation.

In the implementations described further herein, magnetic cores having variable permeability characteristics are described that provide increased inductance over a wider range of DC current values. In some implementations, the variable permeability characteristics are determined with a goal of reducing inductor nonlinearities so that a permeability for a predetermined amount of flux density is greater than a predetermined threshold, which results in an increased inductance for a wide range of current values, which reduces losses in the inductor. In addition, the variable permeability characteristics of the magnetic core can be designed so a flux density saturation area of the magnetic core is less than a predetermined threshold and/or a core loss density is less than a predetermined threshold. The variable permeability characteristics of the magnetic core can be designed based on design parameters of the inductor and/or operational parameters of the inductor. For example, the operational parameters can include at least one of an inductance, direct current (DC) bias, flux density characteristics, or core loss characteristics of the inductor.

Figure 5:
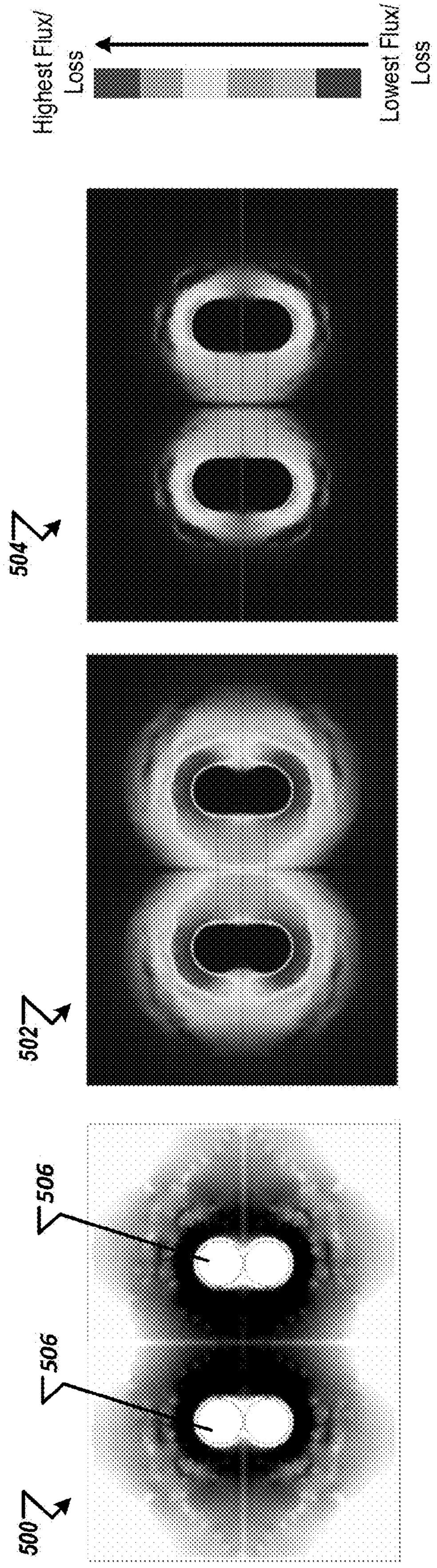
FIG. 5 is an exemplary illustration of core structure, flux density, and core loss density of an inductor magnetic core.

FIG. 5 is an exemplary illustration of core structure 500, flux density 502, and core loss density 504 of a magnetic core of a planar inductor having variable permeability characteristics. The structure of the magnetic core 500 is composed of a heterogeneous ferrite material having multiple densities throughout the magnetic core. For example, the shading of the core structure 500 indicates a relative amount of ferrite material or air at various locations throughout the core structure 500. For example, each of the densities throughout the magnetic core correspond to a ratio of the ferrite material to air at one or more locations throughout the magnetic core, in which the ratio of the ferrite material to air is based on the variable permeability characteristics. Areas of increasingly darker shading indicate that more ferrite material is present than air at a particular location, and areas of lighter shading indicate that more air is present than ferrite material at a particular location. In some implementations, ferrite material to air ratios for various locations throughout the core structure are determined using a topology optimization software tool where the variable permeability characteristics can be determined to achieve a predetermined amount of inductance while maintaining losses below a predetermined amount. In some examples, increasing the amount of air present at various locations throughout the core structure 500 can reduce an overall strength of the core structure 500, which is another design consideration that goes into effect when determining the densities throughout the magnetic core.

In some implementations, other design characteristics for the core structure 500 and associated coils can be determined to achieve operational parameters for the planar inductor. For example, the core structure 500 has a non-rectangular shape with cutouts around an outer edge of the core structure 500. In some examples, the cutouts can have a rounded shape. Locations and shapes for one or more air gaps 506 in the core structure 50 can also be determined in order to achieve a predetermined flux density pattern across the magnetic core. For example, the air gaps 506 can have an oval shape, which corresponds to an oval flux density pattern, as shown in the flux density illustration 504. In addition, at least one coil is wound through the one or more air gaps 506 and is configured to be excited by an electric current passing through the inductor, which produces the oval-shaped flux density pattern. In some implementations, the oval-shaped flux density pattern generates smaller amounts of core losses than the implementations described previously with respect to FIG. 1 and FIG. 3, as shown in the core loss density illustration 504. When the design parameters and variable permeability characteristics have been determined, the core structure 500 is generated via three-dimensional (3D) printing as a single structure produced using a binder (e.g., resin) matrix with magnetic filler material.

Figure 6:
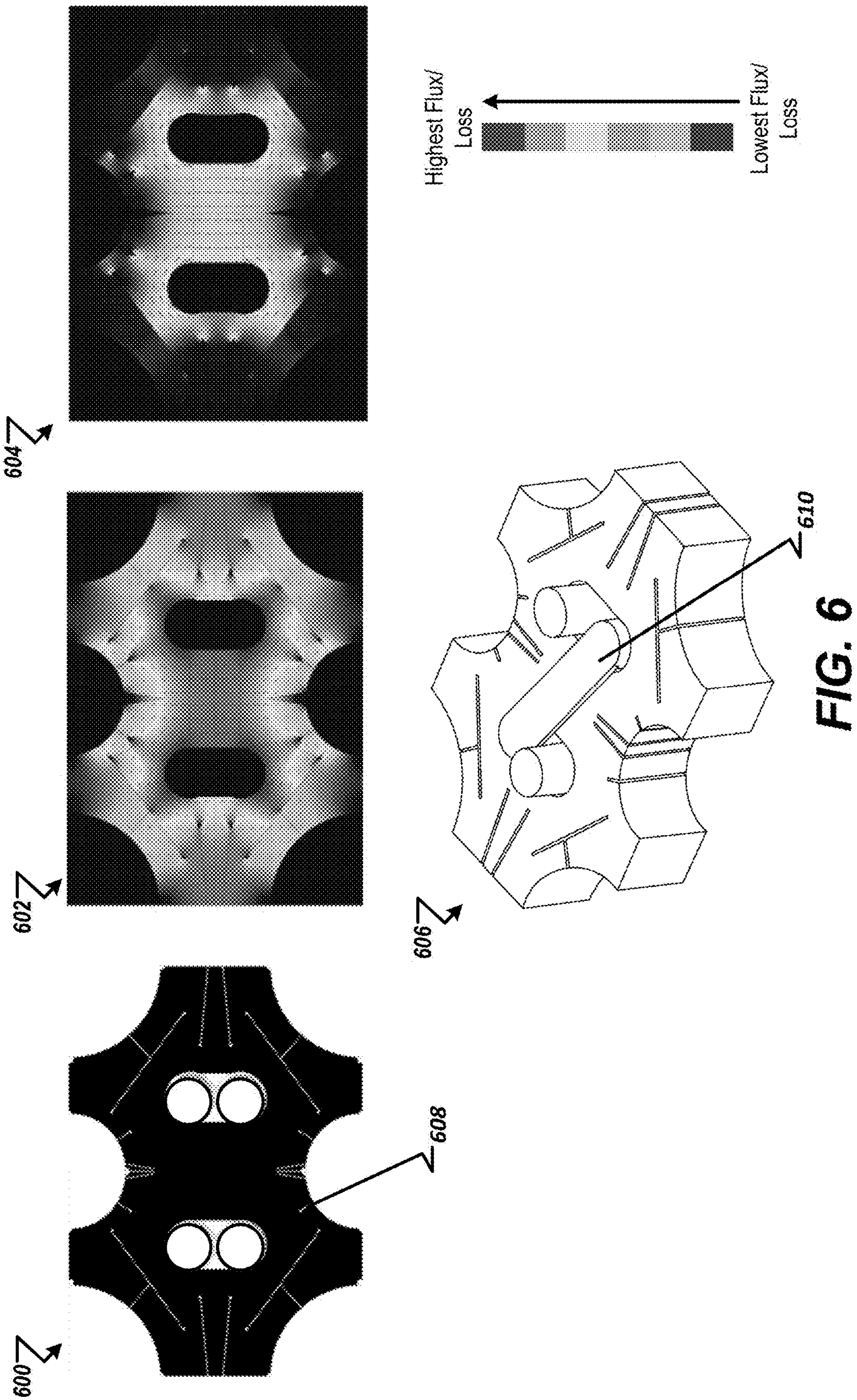
FIG. 6 is an exemplary illustration of core structure, flux density, and core loss density of an inductor magnetic core.

FIG. 6 is an exemplary illustration of core structure 600, flux density 602, core loss density 604, and 3D core structure 606 of a magnetic core of a planar inductor having variable permeability characteristics. The structure of the magnetic core 600 is composed of a homogenous ferrite material having multiple slits 608, which are configured at predetermined locations and orientations throughout the core structure 600 based on the variable permeability characteristics. For example, the slits that are cut into the core structure 600 are configured so that a flux density pattern as shown in the flux density illustration 602 approximates the oval-shaped flux density pattern of the core structure 500 described previously (FIG. 5). The dimensions, orientations, and lengths of the slits 608 can be determined by using a topology optimization tool.

The core structure 600 also includes oval-shaped air gaps that correspond to the oval-shaped flux density pattern, and the illustration of the 3D core structure 606 shows how coil 610 is wound through the air gaps. In addition, a geometry of the core structure 600 is also similar to the core structure 500 with a non-rectangular shape and rounded cutouts around an outer edge of the core structure 600. While the planar inductor with the core structure 600 has greater core losses than the core structure 500, as shown in the core loss density illustration 604, the core losses are still less than the core losses for planar inductors having the core structures 100 and 300. Also, manufacturing the core structure 600 that is made of a homogenous ferrite material is less complex and less expensive than manufacturing the core structure 500 that is made of the heterogeneous ferrite material.

Figure 7:
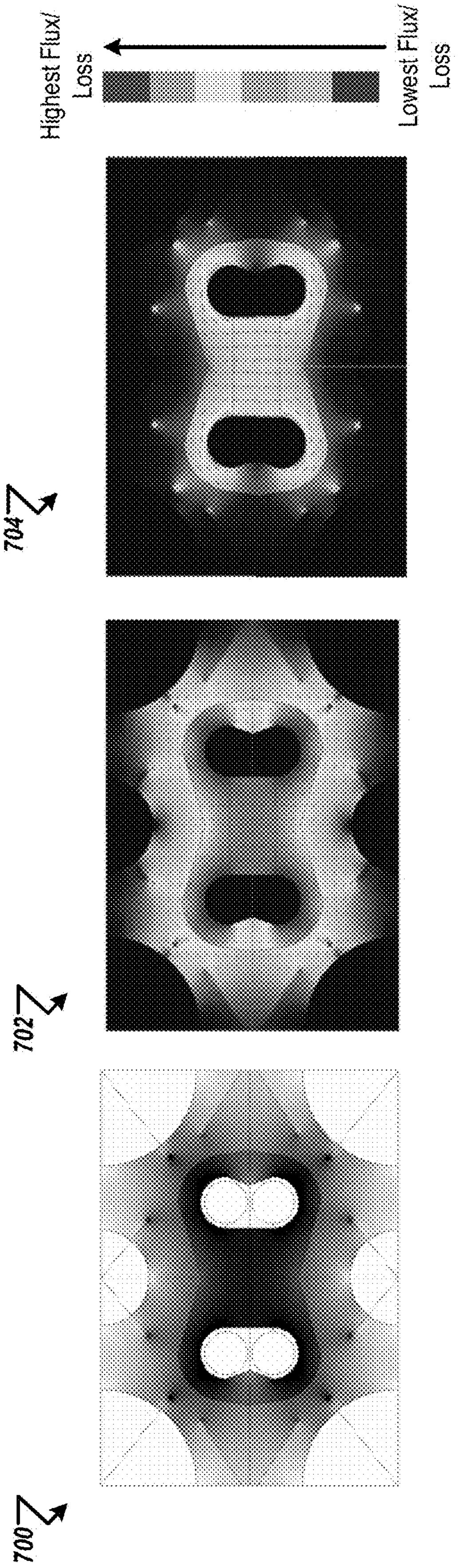
FIG. 7 is an exemplary illustration of core structure, flux density, and core loss density of an inductor magnetic core.

FIG. 7 is an exemplary illustration of core structure 700, flux density 702, and core loss density 704 of a magnetic core of a planar inductor having variable permeability characteristics, in which the core structure 700 includes features of both core structures 500 and 600. The core structure 700 can be composed of a heterogeneous ferrite material that uses two types of ferrite material having two different densities and corresponding permeabilities in addition to locations of air within the core structure 700. For example, the core structure can include a first ferrite material with a first density at one or more first locations within the magnetic core, and a second ferrite material at a second density at one or more second locations within the magnetic core. The densities of the first ferrite material and the second ferrite material are based on a ratio of the ferrite material to air. In some implementations, the first ferrite material is 100% ferrite and 0% air, and the second ferrite material is 60% ferrite and 40% air, resulting in the first density of the first ferrite material being greater than the second density of the second ferrite material. In the illustration of the core structure 700, locations having a darkest amount of shading correspond to the first ferrite material and areas of lighter shading correspond to the second ferrite material. The locations of the first ferrite material, the second ferrite material, and the air within the core structure 700 can be determined using a topology optimization tool based on variable permeability characteristics that result in predetermined operational parameters of the planar inductor.

In addition to the heterogeneous ferrite material, the core structure 700 also includes multiple slits configured at predetermined locations and orientations throughout the magnetic core based on the variable permeability characteristics. Like the core structure 600 (FIG. 6), the slits that are cut into the core structure 700 are configured so that a flux density pattern as shown in the flux density illustration 702 approximates the oval-shaped flux density pattern of the core structure 500 described previously (FIG. 5). The dimensions, orientations, and lengths of the slits can be determined by using the topology optimization tool.

The core structure 700 also includes oval-shaped air gaps that correspond to the oval-shaped flux density pattern, and a coil that is wound through the air gaps. In addition, a geometry of the core structure 700 is also similar to the core structure 500 with a non-rectangular shape and rounded cutouts around an outer edge of the core structure 700. While the planar inductor with the core structure 700 has greater core losses than the core structure 500, as shown in the core loss density illustration 704, the core losses are still less than the core losses for planar inductors having the core structures 100, 300, and 600. Also, manufacturing the core structure 700 that is made of a heterogeneous ferrite material that includes only two density variations is less complex and less expensive than manufacturing the core structure 500 that is made of the heterogeneous ferrite material having a larger number of density variations.

Figure 8:
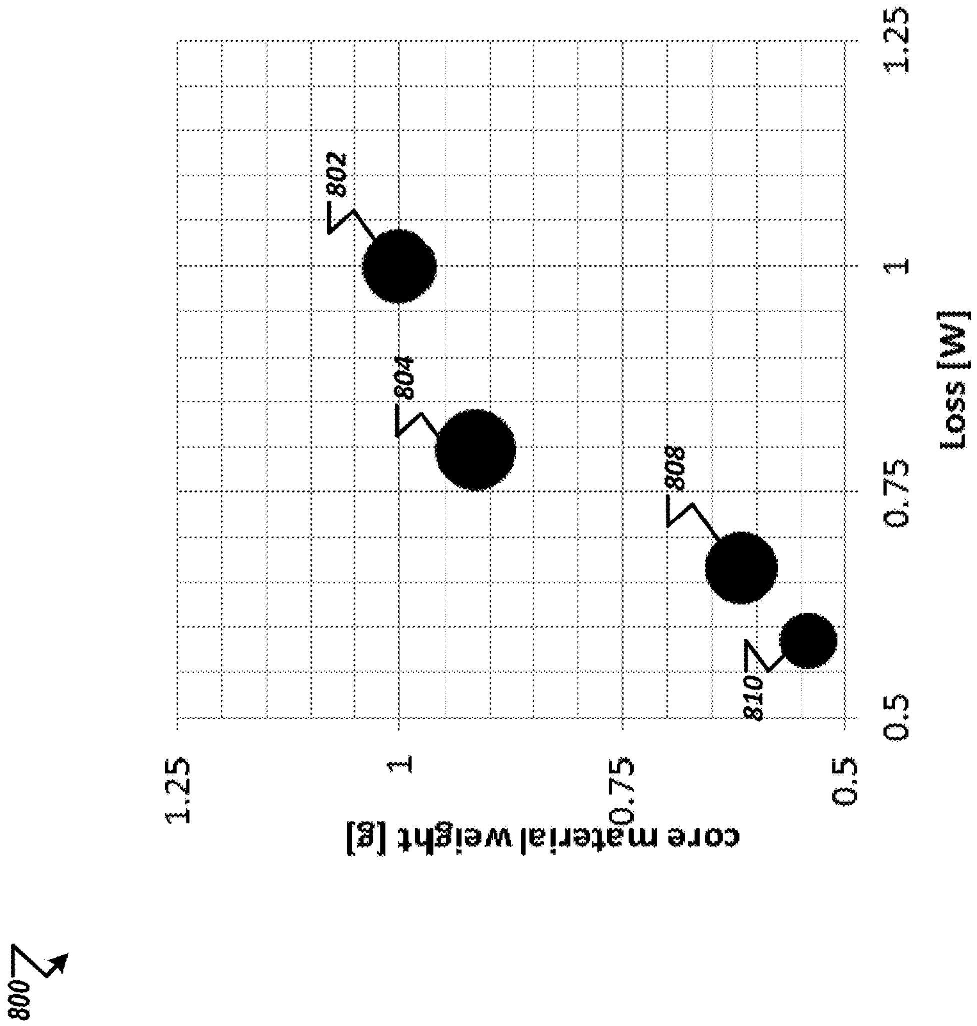
FIG. 8 is an exemplary graph of core weight versus core losses for various magnetic core designs.

FIG. 8 is an exemplary graph 800 of core weight versus core losses for various magnetic core designs described previously herein. For example, point 802 corresponds to core structure 100 or core structure 300, point 810 corresponds to core structure 500, point 804 corresponds to core structure 600, and point 808 corresponds to core structure 700. Inductances for all of the core structures are designed to the same value, and a size of each illustrates a loss density [W/mm$^2$], which provides an indication of cooling difficulty. The core structure 500 indicated by point 810 has the best loss performance, and the core structures 600 (point 804) and 700 (point 808) have better loss performance as compared to core structures 100 and 300 (point 802).

Figure 9:
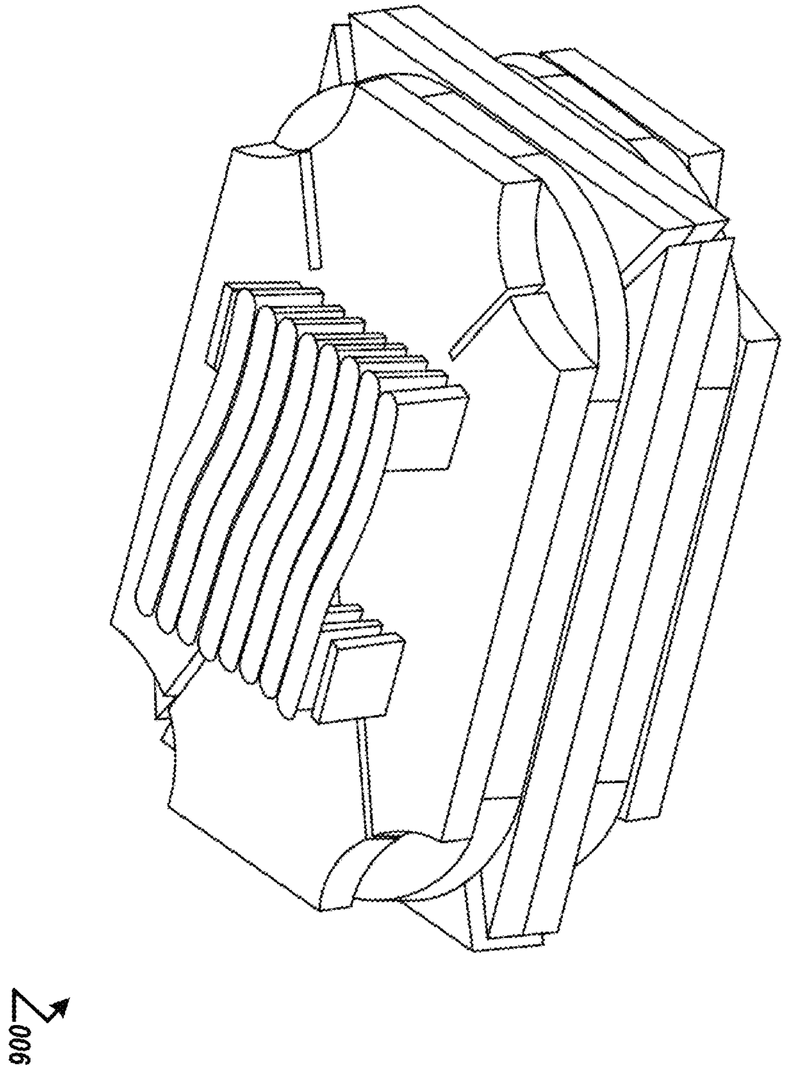
FIG. 9 is an exemplary illustration of an inductor with stacked magnetic cores.
Figure 10:
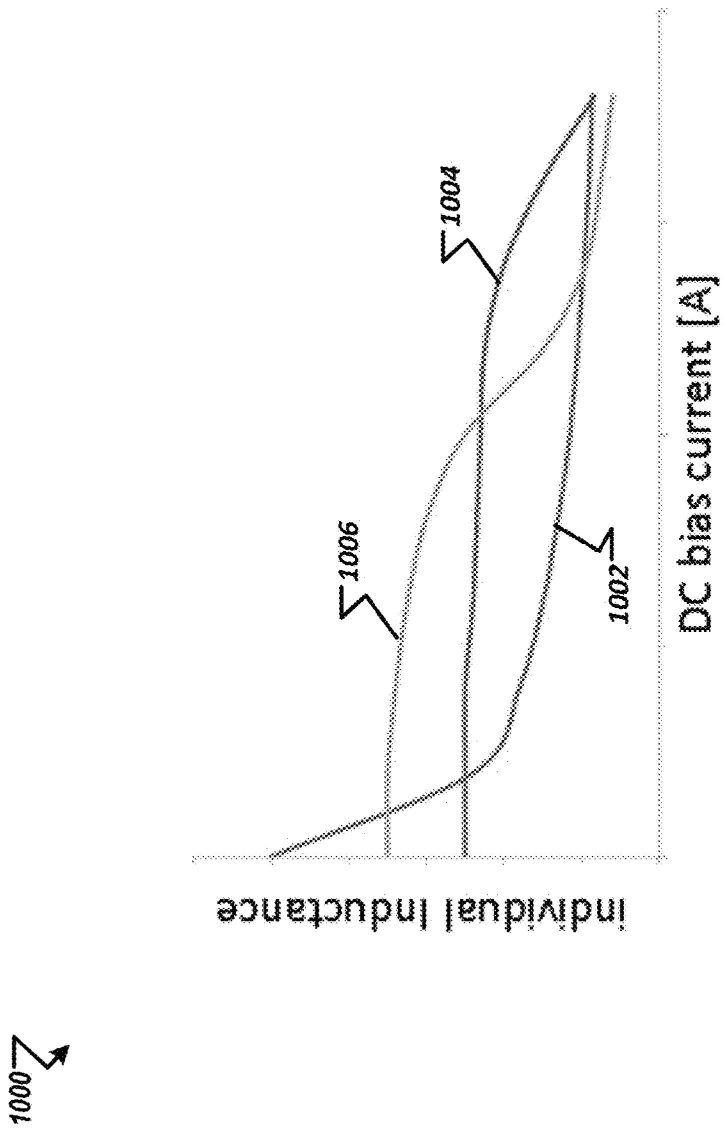
FIG. 10 is an exemplary graph of inductance versus DC bias for various magnetic core designs.
Figure 11:
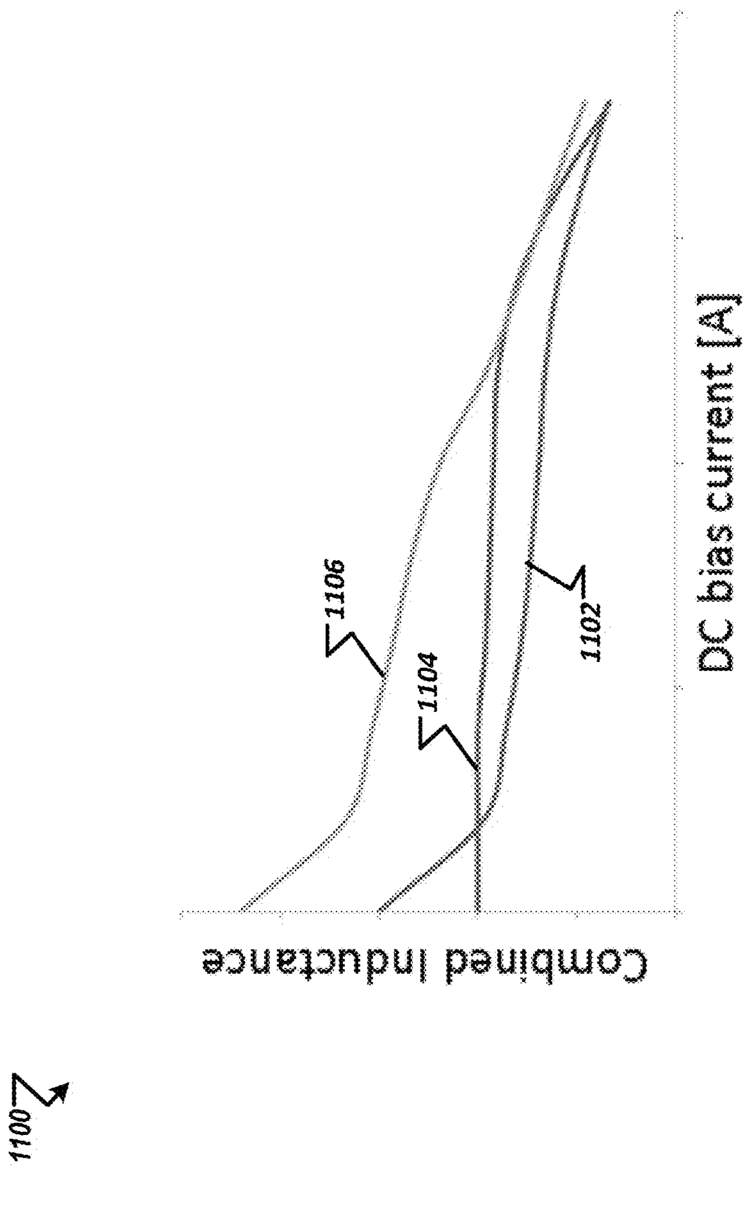
FIG. 11 is an exemplary graph of inductance versus DC bias for various stacked magnetic core designs.

FIG. 9 is an exemplary illustration of an inductor 900 with stacked magnetic cores, where each of the magnetic cores has variable permeability characteristics such as those described previously herein with respect to FIG. 5, FIG. 6, and FIG. 7. By stacking the magnetic cores, the inductor 900 is able to have alternative inductive properties than those for with a single magnetic core. FIG. 10 is an example graph 1000 of inductance versus DC bias for various variable permeability magnetic core designs. For example, curves 1002, 1004, and 1006 represent inductance properties over a range of DC current values for three different magnetic core designs. By combining magnetic cores into a multi-layer stack, additional design solution are obtained without having to re-design individual magnetic core structures. FIG. 11 is an exemplary graph 1100 of inductance versus DC bias for various stacked magnetic core designs. For example, curve 1102 represents stacked magnetic cores represented by curves 1002 and 1004 in FIG. 10, curve 1104 represents stacked magnetic cores represented by curves 1004 and 1006, and curve 1106 represents stacked magnetic cores represented by curves 1002, 1004, and 1006.

Figure 12:
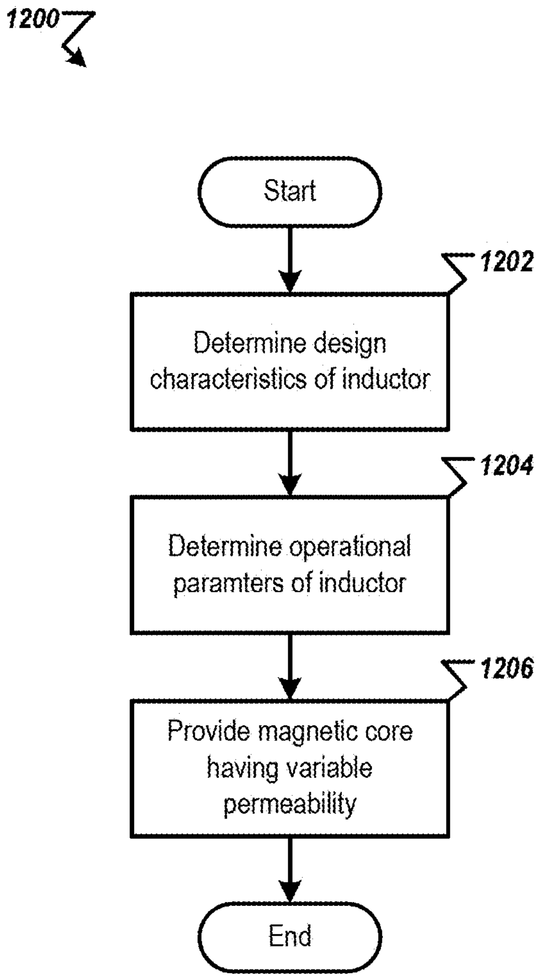
FIG. 12 is an exemplary flowchart of a variable permeability core design process 1200.

FIG. 12 is an exemplary flowchart of a variable permeability core design process 1200. The variable permeability core design process 1200 is described herein with respect to variable magnetic core structures 500, 600, and 700, but it can be understood that the process 1200 can also be applied to other types of variable permeability core structures.

At step 1202, design parameters for a planar inductor are determined. When the core structure is designed, various design parameters can be taken into account to achieve predetermined operational parameters of the planar inductor. For example, the design parameters can include at least one of dimensions of the magnetic core, shape of the magnetic core, positions of the one or more air gaps on the magnetic core, size of the one or more air gaps, or material properties of the magnetic core. Other design parameters that can be taken into account include size constraints for a circuit in which the planar inductor is installed.

At step 1204, operational parameters for the planar inductor are determined, which can include including at least one of an inductance, DC bias, flux density characteristics, or core loss characteristics. For example, the operational parameters of the planar inductor can include a minimum allowable inductance for a particular DC current value.

At step 1206, a magnetic core is provided that is composed of a magnetic material having variable permeability characteristics based on at least one of the design parameters or the operational parameters of the inductor. Magnetic cores having variable permeability characteristics provide increased inductance over a wide range of DC current values. In some implementations, the variable permeability characteristics are determined with a goal of reducing inductor nonlinearities so that a permeability for a predetermined amount of flux density is greater than a predetermined threshold, which results in an increased inductance for a wide range of current values, which reduces losses in the inductor. In addition, the variable permeability characteristics of the magnetic core can be designed so a flux density saturation area of the magnetic core is less than a predetermined threshold and/or a core loss density is less than a predetermined threshold.

In some implementations, the variability permeability magnetic cores can have structures that correspond to those described previously with respect to core structures 500, 600, and 700 and can include heterogeneous or homogenous ferrite material and may include slits that are configured at predetermined locations and orientations around the magnetic core. In some implementations, ferrite material to air ratios for various locations throughout the core structure and/or locations, lengths and orientation of the slits can be determined using a topology optimization software tool where the variable permeability characteristics can be determined to achieve a predetermined amount of inductance while maintaining losses below a predetermined amount. When the variable permeability characteristics for the magnetic core have been determined, the core structure is generated via three-dimensional (3D) printing as a single structure produced using a binder (e.g., resin) matrix with magnetic filler material.

Aspects of the present disclosure are directed to implementations for a planar inductor having a magnetic core made of non-linear magnetic material. The variable permeability core implementations described herein provide improved flux density distributions and reduced inductor losses by designing variable permeability magnetic cores using structural design optimization techniques and three-dimensional (3D) printing in order to design smaller magnetic cores with more uniform and predictable magnetic flux distributions.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Accordingly, other implementations are within the scope that may be claimed.

The invention claimed is:

1. An inductor, comprising:

a solid magnetic core having a structure to cause different regions of the magnetic core to have different permeability characteristics, the solid magnetic core including:

one or more air gaps, at least one rounded cutout in an outer edge of the solid magnetic core, and a plurality of slits; and a coil wound through the one or more air gaps without passing through the at least one rounded cutout and configured to be excited by an electric current, wherein the solid magnetic core includes a first region and a second region, the first region includes all portions of the solid magnet core around which the coil is wound, the second region includes all portions of the solid magnetic core other than the first region, and at least one of the plurality of slits is disposed completely in the second region.

2. The inductor of claim 1, wherein a shape of the one or more air gaps in the solid magnetic core correspond to a predetermined permeability characteristic pattern across the solid magnetic core that causes the different regions of the magnetic core to have different permeability characteristics.

3. The inductor of claim 2, wherein the shape of the one or more air gaps is an oval shape.

4. The inductor of claim 1, wherein the solid magnetic core is composed of a homogenous ferrite material, and wherein the plurality of slits are configured at predetermined locations and orientations throughout the solid magnetic core to cause the different regions of the solid magnetic core to have the different permeability characteristics.

5. The inductor of claim 1, wherein the plurality of slits are not connected to the one or more air gaps.

6. The inductor of claim 1, wherein a single slit of the plurality of slits has two distal ends, and the two distal ends of the single slit are spaced from the outer edge.

7. The inductor of claim 1, wherein at least two of the plurality of slits are non-parallel.

8. The inductor of claim 1, the plurality of slits have varied lengths.

9. The inductor of claim 1, wherein at least one of the plurality of slits is T-shaped.

10. The inductor of claim 1, wherein at least one of the plurality of slits intersects another of the plurality of slits.

11. The inductor of claim 10, wherein the at least one of the plurality of slits intersects the other of the plurality of slits between distal ends of the other of the plurality of slits.

12. The inductor of claim 1, wherein at least one of the plurality of slits begins at the outer edge in the at least one rounded cutout.

13. The inductor of claim 1, wherein the outer edge is a first outer edge, the solid magnetic core includes a second outer edge perpendicular to the first outer edge, an imaginary extension of the first outer edge and an imaginary extension of the second outer edge intersect to form a corner, the at least one rounded cutout includes a plurality of rounded cutouts, a first of the rounded cutouts is in just the first outer edge, and a second of the rounded cutouts is in the first outer edge and the second outer edge at the corner.

14. The inductor of claim 13, wherein a first of the plurality of slits begins in the first of the rounded cutouts, and a second of the plurality of slits begins in the second of the rounded cutouts.

15. The inductor of claim 14, wherein a shape of the first of the plurality of slits is different from a shape of the second of the plurality of slits.

16. The inductor of claim 14, wherein the second of the plurality of slits intersects a third of the plurality of slits between distal ends of the third of the plurality of slits.

17. The inductor of claim 15, wherein the second of the plurality of slits intersects a third of the plurality of slits between distal ends of the third of the plurality of slits.

* * * * *